United States Patent [19]

Murphy et al.

[11] 4,052,893

[45] Oct. 11, 1977

[54] MEASURING RESERVOIR OIL SATURATION

[75] Inventors: Robert P. Murphy; William W. Owens, both of Tulsa, Okla.

[73] Assignee: Standard Oil Company (Indiana), Chicago, Ill.

[21] Appl. No.: 727,929

[22] Filed: Sept. 29, 1976

[51] Int. Cl.$^2$ ............................................. E21B 47/10
[52] U.S. Cl. ..................................................... 73/155
[58] Field of Search .................. 73/152, 155; 166/252; 250/258, 259; 324/10

[56] References Cited

U.S. PATENT DOCUMENTS

| | | | |
|---|---|---|---|
| 3,748,474 | 7/1973 | Murphy | 250/258 X |
| 3,817,328 | 6/1974 | Neuman | 73/152 X |

*Primary Examiner*—Jerry W. Myracle
*Attorney, Agent, or Firm*—Albert C. Metrailer; Arthur McIlroy

[57] ABSTRACT

A procedure for obtaining data to determine both residual and mobile oil saturations in the vicinity of a test well. The steps are (1) drill with oil or oil-base mud, (2) produce to remove oil filtrate, (3) run laterolog, microlaterolog and pulsed neutron capture log, (4) inject high salinity water, (5) run a second microlaterolog and pulsed neutron capture log, (6) inject fresh water, and (7) run a third pulsed neutron capture log. The data obtained from the logs of the procedure is sufficient to determine the residual oil saturation, the capture cross section of the rock matrix, the saturation exponent, the salinity of the water in the formation after production, and mobile oil saturation both in the oil filtrate invaded zone and beyond the invaded zone.

6 Claims, No Drawings

MEASURING RESERVOIR OIL SATURATION

BACKGROUND OF THE INVENTION

This invention relates to a method of logging a subsurface formation penetrated by a well bore to determine oil saturation.

The methods of producing oil from underground formations are usually separated into three categories, termed primary, secondary and tertiary methods. In primary production, oil is moved from the formation to a bore hole, and sometimes to the earth's surface, merely by formation fluid pressure. In secondary production, a sweep fluid, such as water or gas, is typically injected in one well to physically push oil through the rock to a producing well. Tertiary recovery typically involves the use of a fluid miscible with both water and oil which is used in front of injected water to remove oil which cannot be removed from the formation by simple water floods. The secondary and tertiary recovery methods are progressively more expensive than primary recovery since they both involve the application of external force and in addition, tertiary recovery requires the injection of expensive chemical compounds into the formation. Before beginning a tertiary recovery project, it is essential to know how much oil was left in the formation after a secondary recovery project was completed.

With the development of pulsed neutron capture logging devices, several basic methods for determining residual oil saturations in a formation have been developed. A description of some of these methods may be found in the article entitled, "Methods for Determining Residual Oil with Pulsed Neutron Capture Logs" by J. E. Richardson, et al, published in the *Journal of Petroleum Technology* in May, 1973 at pages 593–606. Numerous patents have also been issued for such processes such as U.S. Pat. Nos. 3,748,474; 3,757,575; 3,783,683; and 3,825,752. One of the procedures as outlined in the above referenced *Journal of Petroleum Technology* article involves taking two pulsed neutron capture logs of the formation when the water salinity has been changed between the logs. This may involve simply running a log with natural formation water present and again after injecting fresh water. But, as is pointed out in above referenced U.S. Pat. No. 3,783,683, where the formation has been previously flooded with water having a different salinity from the natural formation water, mixed salinity water may occur at the point of testing and the first pulsed neutron log should be preceded by an injection of salt water having known salinity. If the first logging step is preceded by salt water injection, this injection will remove any mobile oil so that only residual oil will be present. If the first logging step is not preceded by the salt water injection then the water in the formation when it is logged may have a varying or mixed salinity and the log readings will have little meaning. Also, if the initial salt water injection is not used, the later injection of fresh water will displace mobile oil and the presumption that only the water salinity changes between the two logs will not be valid. Thus it can be seen that this method involving water having two salinities is useful only for measuring the saturation of residual oil; that is, oil in the formation which is not moved by flowing water.

As illustrated in the above referenced U.S. Pat. No. 3,748,474, the two-step logging procedure may be extended to a third log run after the formation has been injected with an alcohol or other sweep fluid which removes all the oil from the formation. This final logging step provides a direct indication of formation porosity which can replace information normally obtained from cross taken in drilling the well or from other logs. This third logging step does not, however, aid in the determination of mobile oil saturation in the formation.

Since in actual practice a secondary recovery water-flood does not remove all mobile oil from the formation, a measurement of only residual oil in the formation does not indicate the true production potential of a tertiary recovery project. In many cases it may occur that the residual oil alone is insufficient to make a tertiary recovery project profitable but when the mobile oil saturation is considered, the project would be profitable. Therefore, to properly evaluate a water-flooded formation for potential tertiary recovery, it is essential that both mobile and residual oil saturations be measured.

Accordingly, an object of the present invention is to provide a bore hole logging procedure for accurately determining both mobile and residual oil saturations in an underground formation.

Another object of the invention is to provide a bore hole logging procedure for measuring reservoir oil saturation in the presence of formation waters having mixed salinities.

A bore hole logging procedure according to the present invention comprises the steps of (1) drilling a test bore hole through the formation using an oil base drilling mud, (2) producing through the test bore hole to remove oil filtrate, (3) running a short range electrical resistivity log and a pulsed neutron capture log, (4) injecting high salinity water into the formation, (5) running a short range electrical resistivity log and a pulsed neutron capture log, (6) injecting fresh water into the formation, and (7) running a pulsed neutron capture log.

DESCRIPTION OF THE PREFERRED EMMBODIMENTS

Since most bore hole logging tools, such as the pulsed neutron capture logs, measure a portion of the formation near the bore hole, usually within a two-foot radius of the bore hole, it is essential that conditions within this two-foot radius be representative of conditions in the rest of the formation for the measurements to be of any value. It has been standard practice when drilling bore holes, even when it is for the purpose of evaluating a formation, to use a water-base drilling mud. When such a mud is used and the formation rock is preferentially oil-wet, the oil displaced by the drilling fluids which invade a region near the bore hole cannot be entirely removed by producing the well after drilling is complete. That is, some of the water filtrate is trapped and held immobile in the rock pore space adjacent the well. Therefore, to avoid this problem, Step 1 of this invention is to drill through the formation to be evaluated using an oil-base drilling mud. In the preferred embodiment, lease crude is used as a drilling fluid, but the term oil-base mud is used to mean a suitable oil either alone or with solid additives. If the rock is water-wet in the invaded zone, production will remove the oil filtrate and will effectively return the formation to the original saturation conditions.

Step 2 is to provide the well slowly after drilling is complete to remove the mud filtrate from the invaded zone and thereby return the formation near the bore hole to its original saturation condition. After this production step, the formations near the bore hole should contain essentially the same saturations of residual and mobile oil and formation water as it had prior to drilling the test bore hole. If formation water has mixed salinity, the mixed salinity condition should return to this test region.

Step 3 of the preferred process is to run two electric resistivity logs and a pulsed neutron capture log. One of the electrical resistivity logs has a depth of measurement beyond the invaded zone. A typical logging device useful for this purpose is known as a laterolog which is described in U.S. Pat. No. 2,712,627. Any long range electrical logging device, such as an induction log, which can provide a measure of the formation resistivity at a depth of investigation beyond the invaded zone may be used for this electrical log. The second electrical resistivity log of this step is a short range electrical log which measures resistivity of the formation near the borehole. The device used in the preferred embodiment is called microlaterolog and is essentially the same as the device illustrated in U.S. Pat. No. 2,712,629. Other similar devices, such as proximity and short normal logs, which provide a measure of formation resistivity close to the bore hole and thus in the same range investigated by the pulsed neutron capture log may be used in this resistivity log. The essential difference between these two electrical resistivity logs is that the long range device should be only slightly affected by the invaded zone while the short range device should be strongly affected by the invaded zone. The short range device in the preferred embodiment is chosen to have about a two foot depth of investigation which corresponds to the usual range of the pulsed neutron capture logging devices. As can be seen from the description of the use of the log data which follows, the primary reason for running these two different electrical logs is to provide an indication of how effectively Step 2 restored the formation near the borehole to original conditions. A description of a suitable pulsed neutron capture logging device and its use may be found in the article "Neutron Lifetime, a New Nuclear Log," A. H. Youmans, et al, *Journal of Petroleum Technology*, (March, 1964) 319-328.

Step 4 is to inject into the formations being investigated sufficient salt water to sweep back the mobile formation water and oil at least two feet from the bore hole. In the preferred embodiment the pulsed neutron log is continuously run during the water injection to allow detection of complete displacement at which prior the log measurements stop changing. The more common procedure of injecting from three to five barrels of saltwater per foot of net pay may also be used. The salinity of the water used in this step should be high and in the preferred embodiment is at least 150,000 ppm sodium chloride. The exact salinity of the water should be known before the injection step so that the capture cross section of the water may be calculated.

Step 5 is to run a second microlaterolog or other short range electrical resistivity log and a second pulsed neutron capture log of the formation.

Step 6 is to inject fresh water into the formation being investigated. The logging while injecting procedure as used in step 4 is preferred, but a suitable alternative is to inject three to five barrels of fresh water per foot of net pay. This quantity is again selected to insure that the salt water injected in Step 4 is swept at least two feet away from the borehole. In the preferred embodiment the fresh water has a known salinity of less than 2,000 ppm sodium chloride, again allowing calculation of the water capture cross section. The term fresh water is used here to mean water of significantly lower salinity than the saltwater injected in Step 4. It is well known that injection of absolutely fresh water into oil bearing formations is to be avoided due to possible clay damage and reduction in permeability. The basic log-inject-log procedure only requires that there be a significant difference in salinities of the two formation waters. The process disclosed in U.S. Pat. No. 3,783,683 is suitable for use in this fresh water injection step to prevent clay damage.

Step 7 is to run a third pulsed neutron capture log. As is common practice in the logging art, the three pulsed neutron logs of this process should all be run with the same logging device to improve the accuracy of the readings. The quantity which is measured by a pulsed neutron capture log is the thermal neutron capture cross section of the formation and it is generally represented by the symbol $\Sigma$. A detailed explanation of the meaning of capture cross section readings obtained from a pulsed neutron capture log will not be made here since it is well known in the art as a review of the above cited references will show.

The logs, both electrical and pulsed neutron, which are run in various steps for the present process, are essentially continuous logs run with the logging tool moving through the bore hole. Each log, therefore, provides a series of data points which are correlated with depth in the bore hole. The illustration of the use of data obtained in this process which follows shows how the data for a particular bore hole depth is used to obtain the desired information relating to formation hydrocarbon content at that bore hole depth.

The first quantity determined by use of the data obtained in this process is the residual oil saturation in the formation after saltwater injection. Since, as is known in the prior art, the pulsed neutron capture logs measure chlorine content which is closely related to water saturation, the first quantity calculated is $S_{w2}$, which is the formation water saturation after injecting saltwater as a fraction of pore space. The residual oil saturation is the complement of the water saturation, $S_{w2}$. Th equation for this quantity is;

$$S_{w2} = \frac{(\Sigma_{fs} - \Sigma_{ff})}{\phi(\Sigma_{ws} - \Sigma_{wf})} \tag{1}$$

where:
- $\Sigma_{fs}$ = the capture cross section of the formation after injecting salt water.
- $\Sigma_{ff}$ = the capture cross section of the formation after injecting fresh water.
- $\phi$ = porosity of the formation as a fraction of bulk volume.
- $\Sigma_{ws}$ = the capture cross section of the salt water injected in Step 4, and
- $\Sigma_{wf}$ = the capture cross section of the fresh water injected in Step 6.

Since in a formation evaluation according to the preferred embodiment a new bore hole is drilled, core samples may be taken in the drilling process and the porosity $\phi$ is measured from these core samples. Other porosity measurement methods may be used if desired. The capture cross sections of the injected salt water and fresh water are calculated based upon the mineral content of these injection waters using known methods.

The capture cross section of the rock matrix, designated $\Sigma_r$, may also be calculated using the above defined quantities in solving equation 2:

$$\Sigma_r = \frac{\Sigma_{ff} - \Sigma_{wf}\phi}{1 - \phi} \quad (2)$$

The saturation exponent, designated $n$, may be computed using the following equation:

$$n = \frac{\log(FR_{ws}/R_{ts})}{\log(S_{w2})} \quad (3)$$

where:

$S_{w2}$ = the water saturation calculated in Equation (1)
$F$ = the formation resistivity factor obtained from electrical measurements across core samples
$R_{ws}$ = the electrical resistivity of salt water which was injected in Step 4
$R_{ts}$ = the electrical resistivity of the formation measured by the microlaterolog run in Step 5.

The salinity of the actual water in the formation after producing the test well in Step 2, can be computed from the responses of the logs of Step 3 using the following equation:

$$(R_{wp})^{\frac{1}{n}} (\Sigma_{wp} - \Sigma_o) = \frac{[\Sigma_{fp} - (1 - \phi)\Sigma_r - \phi\Sigma_o](R_{tp}/F)^{\frac{1}{n}}}{\phi} \quad (4)$$

where:

$R_{wp}$ = the electrical resistivity of water in the formation.
$\Sigma_{wp}$ = the capture cross section of water in the formation.
$\Sigma_O$ = the capture cross section of oil in the formation computed from a fractional analysis of oil either produced or taken from cores
$\Sigma_{fp}$ = the capture cross section of the formation measured by the neutron decay time log in Step 3.
$R_{tp}$ = the electrical resistivity of the formation as measured by the microlaterlog of Step 3.

Other terms are described or calculated above.

While it is apparent that there are two unknowns in Equation 4, that is $R_{wp}$ and $\Sigma_{wp}$, the two terms have a known relationship. As an example, the known relationship between the capture cross section and resistivity of a salt water solution can be determined by reference to pages 9 and 66 of the publication entitled "Log Interpretation Charts" published by Schlumberger, Ltd., copyright 1972. The chart on page 9 of this publication relates resistivity to salinity of a water solution and the chart on page 66 relates capture cross section to salinity. Equation 4 may therefore be solved iteratively by assuming a salinity value, which may be determined from produced waters, and substituting corresponding resistivity and capture cross section values into Equation 4. The assumed value must then be incrementally increased or decreased until a proper solution for the equation is found. Since the salinity of water in a waterflooded formation typically varies with depth, the average value obtained by measuring actually produced water will not necessarily represent the salinity in any given depth of the bore hole. The actual salinity of the formation water at each depth must be known to allow accurate determination of mobile oil in the formation at each particular depth. The solution in Equation 4 provides these actual resistivity values at each position in the bore hole.

One measure of the mobile oil in the formation can be made by computing the water saturation of the invaded zone, $S_{wi}$, from the following equation:

$$(S_{wi})^n = \frac{FR_{wp}}{R_{tp}} \quad (5)$$

where:

$R_{wp}$ is calculated from Equation (4) and the other terms are as defined above.

A second indication of mobile oil in the formation can be determined by computing the saturation of water in the formation beyond the invaded zone, $S_w$, according to the following equation:

$$(S_w)^n = \frac{FR_{wp}}{R_t} \quad (6)$$

where:

$R_t$ = resistivity of the formation as measured by the laterolog is Step 3.

And the other terms are as computed or described above.

The actual total oil saturation in the formation is the complement of the water saturations $S_{wi}$ and $S_w$. The two water saturations calculated should be equal if Step 2 effectively removed the oil filtrate from the invaded zone. The residual oil saturation is the complement of the water saturation $S_{w2}$ calculated in Equation 1. The difference between the two oil saturations represents the mobile oil saturation.

It is apparent that the term $R_t$, that is the resistivity measured by the long range electrical logging device in Step 3, is used only in equation (6). Since this quantity is used only in checking the validity of the assumption that the production of fluids in Step 2 effectively restored formation fluids to their native condition, it is not essential to the process of measuring both mobile and residual oil saturation.

Although the present invention has been shown and illustrated in terms of a specific process, it will be apparent that changes or modifications can be made without departing from the spirit of the invention as defined in the appended claims.

We Claim:

1. A method of logging a subsurface formation to determine both residual and mobile oil saturations comprising:

drilling a well through the subsurface formation using an oil-base drilling fluid;

producing fluids from the subsurface formation to remove drilling fluid filtrate from the formation;

logging the formation with, in any order, a short range electrical resistivity logging device and a pulsed neutron capture log;

injecting into the formation sufficient salt water to displace mobile formation fluids at least two feet from the bore hole, the salinity of said salt water being greater than 100,000 ppm NaCl;

logging the formation with, in any order, a short range electrical resistivity logging device and a pulsed neutron capture logging device;

injecting into the formation sufficient fresh water to displace mobile formation fluids at least two feet from the bore hole, said fresh water having a salinity of less than 5,000 ppm NaCl; and, logging the formation with a pulsed neutron capture logging device.

2. A logging method according to claim 1 further including, after the step of producing fluids from the subsurface formation, the step of logging the formation with a long range electrical resistivity logging device.

3. A logging method according to claim 1 further including the step of repetitively running a pulsed neutron capture logging device in the bore hole while salt water is being injected into the formation and stopping the salt water injection when successive logs show no change in readings.

4. A logging method according to claim 1 wherein a preselected quantity of saltwater is injected into the formation, said preselected quantity being in the range of three to five barrels of salt water per foot of producing formation being investigated.

5. In a log-inject-log process of the type wherein a formation is injected with salt water of known salinity, the formation is logged with a pulsed neutron capture log, the formation is injected with fresh water, and the formation is again logged with a pulsed neutron capture log so that residual oil saturation in the formation may be calculated from the two logs, the improvement comprising:

before the injection of salt water the steps of;
drilling a test bore hole through the formation using an oil base drilling mud,
producing the formation to remove oil filtrate, and
logging the formation with, in any order, a short range electrical resistivity logging device and a pulsed neutron capture logging device; and, after the injection of salt water into the formation the step of;
logging the formation with a short range electrical resistivity logging device.

6. In a log-inject-log process according to claim 5 the further improvement comprising, after the step of producing the formation to remove oil filtrate, the step of logging the formation with a long range electrical resistivity logging device.

* * * * *